(12) United States Patent
Pinder

(10) Patent No.: US 7,949,133 B2
(45) Date of Patent: May 24, 2011

(54) CONTROLLED CRYPTOPERIOD TIMING TO REDUCE DECODER PROCESSING LOAD

(76) Inventor: Howard G. Pinder, Norcross, GA (US)

(*) Notice: Subject to any disclaimer, the term of this patent is extended or adjusted under 35 U.S.C. 154(b) by 875 days.

(21) Appl. No.: 11/861,328

(22) Filed: Sep. 26, 2007

(65) Prior Publication Data

US 2009/0080648 A1 Mar. 26, 2009

(51) Int. Cl.
*H04N 7/169* (2011.01)

(52) U.S. Cl. .......... 380/218; 380/35; 380/224; 380/239; 380/261; 713/501

(58) Field of Classification Search .................... 380/224
See application file for complete search history.

(56) References Cited

U.S. PATENT DOCUMENTS

| | | | |
|---|---|---|---|
| 5,224,161 A | 6/1993 | Daniel et al. ..................... 380/14 |
| 5,349,641 A * | 9/1994 | Coutrot et al. ................. 380/241 |
| 5,742,677 A | 4/1998 | Pinder |
| 5,870,474 A | 2/1999 | Wasilewski |
| 5,933,503 A | 8/1999 | Schell et al. |
| 6,005,938 A | 12/1999 | Banker |
| 6,020,982 A | 2/2000 | Yamauchi et al. |
| 6,105,134 A | 8/2000 | Pinder |
| 6,148,082 A * | 11/2000 | Slattery et al. ................ 380/212 |
| 6,157,719 A | 12/2000 | Wasilewski |
| 6,173,400 B1 | 1/2001 | Perlman et al. |
| 6,230,269 B1 | 5/2001 | Spies et al. |
| 6,246,767 B1 | 6/2001 | Akins |
| 6,252,964 B1 | 6/2001 | Wasilewski |
| 6,292,568 B1 | 9/2001 | Akins |
| 6,345,307 B1 | 2/2002 | Booth |
| 6,356,971 B1 | 3/2002 | Katz et al. |
| 6,424,714 B1 | 7/2002 | Wasilewski |
| 6,424,717 B1 | 7/2002 | Pinder |
| 6,510,519 B2 | 1/2003 | Wasilewski |
| 6,516,412 B2 | 2/2003 | Wasilewski |
| 6,526,508 B2 | 2/2003 | Akins |
| 6,560,340 B1 | 5/2003 | Akins |
| 6,574,609 B1 | 6/2003 | Downs et al. |
| 6,727,944 B1 | 4/2004 | Adachi |
| 6,744,892 B2 | 6/2004 | Akins |
| 6,748,080 B2 | 6/2004 | Russ et al. |
| 6,804,357 B1 | 10/2004 | Ikonen et al. |
| 6,937,729 B2 | 8/2005 | Akins |

(Continued)

FOREIGN PATENT DOCUMENTS

EP 0 782 296 7/1997

(Continued)

OTHER PUBLICATIONS

International Preliminary Report of PCT/US2008/077157 issued Mar. 30, 2010.

(Continued)

*Primary Examiner* — David J Pearson (74) *Attorney, Agent, or Firm* — Merchant & Gould (57) ABSTRACT

Systems and methods are disclosed for enabling encryptor devices to provide real-time messages having offset cryptoperiods according to an offset algorithm within common crypto-sync pulse boundaries. A master clock aligns the encryptor devices to a common crypto-sync pulse. Subsequently, a cryptoperiod offset aligner assigns a different offset value according to an algorithm to each encrypted service. The corresponding encryptor device then begins the cryptoperiod, during which real-time messages are transmitted, at the assigned offset value from the common crypto-sync pulse.

20 Claims, 10 Drawing Sheets

U.S. PATENT DOCUMENTS

| | | | |
|---|---|---|---|
| 6,970,564 B1 | 11/2005 | Kubota et al. | |
| 6,971,008 B2 | 11/2005 | Wasilewski | |
| 7,062,658 B1 | 6/2006 | Cheriton et al. | |
| 7,065,216 B1 | 6/2006 | Benaloh et al. | |
| 7,124,303 B2 | 10/2006 | Candelore et al. | |
| 7,127,619 B2 | 10/2006 | Unger et al. | |
| 7,155,609 B2 | 12/2006 | Chan et al. | |
| 7,181,010 B2 | 2/2007 | Russ et al. | |
| 7,200,868 B2 | 4/2007 | Mattox et al. | |
| 7,287,168 B2 | 10/2007 | Candelore et al. | |
| 7,505,592 B2 | 3/2009 | Russ et al. | |
| 7,515,712 B2 | 4/2009 | Wasilewski et al. | |
| 7,519,999 B2 | 4/2009 | Sedacca | |
| 7,636,846 B1 | 12/2009 | Eskicioglu | |
| 2001/0006400 A1 | 7/2001 | Kubo et al. | |
| 2002/0013772 A1 | 1/2002 | Peinado | |
| 2002/0018130 A1 | 2/2002 | Suemoto et al. | |
| 2002/0026582 A1 | 2/2002 | Futamura et al. | |
| 2002/0099663 A1 | 7/2002 | Yoshino et al. | |
| 2002/0101990 A1 | 8/2002 | Morino et al. | |
| 2002/0146237 A1 | 10/2002 | Safadi | |
| 2002/0196939 A1* | 12/2002 | Unger et al. | |
| 2003/0009668 A1 | 1/2003 | Chan | |
| 2003/0021412 A1 | 1/2003 | Candelore et al. | |
| 2003/0026423 A1 | 2/2003 | Unger et al. | |
| 2003/0035543 A1 | 2/2003 | Gillon et al. | |
| 2003/0046686 A1 | 3/2003 | Candelore et al. | |
| 2003/0081776 A1 | 5/2003 | Candelore et al. | |
| 2003/0093680 A1 | 5/2003 | Astley et al. | |
| 2003/0145329 A1 | 7/2003 | Candelore et al. | |
| 2003/0159140 A1 | 8/2003 | Candelore et al. | |
| 2003/0174837 A1 | 9/2003 | Candelore et al. | |
| 2003/0182579 A1 | 9/2003 | Leporini et al. | |
| 2003/0188164 A1 | 10/2003 | Okimoto et al. | |
| 2003/0233558 A1 | 12/2003 | Lieberman | |
| 2004/0022307 A1* | 2/2004 | Dale et al. | 375/222 |
| 2004/0052377 A1 | 3/2004 | Mattox et al. | |
| 2004/0073917 A1 | 4/2004 | Pedlow et al. | |
| 2004/0098591 A1 | 5/2004 | Fahrny | |
| 2004/0098603 A1 | 5/2004 | Corinne | |
| 2004/0123094 A1 | 6/2004 | Sprunk | |
| 2004/0128499 A1 | 7/2004 | Peterka et al. | |
| 2004/0187014 A1 | 9/2004 | Molaro | |
| 2004/0228175 A1 | 11/2004 | Candelore et al. | |
| 2005/0080497 A1 | 4/2005 | Rao | |
| 2005/0091173 A1 | 4/2005 | Alve | |
| 2005/0100162 A1 | 5/2005 | Alve et al. | |
| 2005/0102513 A1 | 5/2005 | Alve | |
| 2005/0102702 A1 | 5/2005 | Candelore et al. | |
| 2005/0105732 A1 | 5/2005 | Hutchings et al. | |
| 2005/0169473 A1 | 8/2005 | Candelore et al. | |
| 2005/0180568 A1* | 8/2005 | Krause | 380/212 |
| 2005/0192904 A1 | 9/2005 | Candelore et al. | |
| 2005/0201559 A1* | 9/2005 | Van Der Heijden | 380/239 |
| 2005/0237396 A1 | 10/2005 | Hagiwara et al. | |
| 2005/0240974 A1 | 10/2005 | Hiramoto et al. | 725/100 |
| 2006/0020786 A1 | 1/2006 | Helms et al. | |
| 2006/0039256 A1 | 2/2006 | Nakamura et al. | |
| 2006/0041905 A1 | 2/2006 | Wasilewski | |
| 2006/0072752 A1 | 4/2006 | Nakano et al. | |
| 2006/0074807 A1 | 4/2006 | Gauba et al. | |
| 2006/0115083 A1 | 6/2006 | Candelore et al. | |
| 2006/0153379 A1 | 7/2006 | Candelore et al. | |
| 2006/0179478 A1 | 8/2006 | Han et al. | |
| 2006/0187951 A1* | 8/2006 | Ginzburg et al. | 370/445 |
| 2006/0200865 A1 | 9/2006 | Leake et al. | |
| 2006/0262926 A1 | 11/2006 | Candelore et al. | |
| 2006/0269060 A1 | 11/2006 | Candelore et al. | |
| 2007/0099694 A1 | 5/2007 | McCarthy et al. | |
| 2007/0150960 A1 | 6/2007 | Dubroeucq et al. | |
| 2007/0189525 A1* | 8/2007 | Wajs | 380/42 |
| 2007/0192586 A1* | 8/2007 | McNeely | 713/153 |
| 2007/0204146 A1 | 8/2007 | Pedlow et al. | |
| 2007/0291940 A1 | 12/2007 | Candelore et al. | |
| 2007/0294170 A1 | 12/2007 | Vantalon et al. | |
| 2007/0294178 A1 | 12/2007 | Pinder et al. | |
| 2008/0005030 A1 | 1/2008 | Schlarb et al. | |
| 2008/0137852 A1* | 6/2008 | Mamidwar | 380/239 |
| 2008/0170687 A1 | 7/2008 | Moors et al. | |
| 2009/0028327 A1 | 1/2009 | Pinder | |
| 2009/0031409 A1 | 1/2009 | Murray | |

FOREIGN PATENT DOCUMENTS

| | | |
|---|---|---|
| EP | 1 014 715 | 6/2000 |
| EP | 1 447 983 A1 | 8/2004 |
| EP | 2 403 586 A | 1/2005 |
| EP | 1 760 619 | 3/2007 |
| WO | WO 00/50978 | 8/2000 |
| WO | WO 00/51041 | 8/2000 |
| WO | WO 01/82588 | 11/2001 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | WO 2009/015116 A1 | 1/2009 |
| WO | WO 2009/018006 | 2/2009 |
| WO | WO 2009/042532 | 4/2009 |

OTHER PUBLICATIONS

European patent application No. 08833391.9 EPO Communication dated May 6, 2010.

U.S. Appl. No. 09/111,958, filed Jul. 8, 1998, entitled "Mechanism and Apparatus for Encapsulation of Entitlement Authorization in Conditional Access System," Inventor: Defreese.

U.S. Appl. No. 10/789,337, filed Feb. 27, 2004, entitled "Secure Negotiation and Encryption Module," Inventor: Sedacca.

U.S. Appl. No. 11/454,421, filed Jun. 16, 2006, entitled "Securing Media Content Using Interchangeable Encryption Key," Inventor: Pinder.

U.S. Appl. No. 10/981,347, filed Mar. 25, 2003, entitled "Mechanism and Apparatus for Encapsulation of Entitlement Authorization in a Conditional Access System," Inventor: Defreese.

U.S. Appl. No. 11/428,367, filed Jun. 30, 2006, entitled "Secure Escrow and Recovery of Media Device Content Keys," Inventor: Schlarb.

U.S. Appl. No. 11/781,412, filed Jul. 23, 2007, entitled "Preventing Unauthorized Poaching of Set Top Box Assets," Inventor: Murray.

U.S. Appl. No. 11/671,506, filed Feb. 6, 2007, entitled "Apparatus for Entitling and Transmitting Service Instances to Remote Client Devices," Inventor: Russ.

U.S. Appl. No. 11/829,647, filed Jul. 27, 2007, entitled "Secure Content Key Distribution Using Multiple Distinct Methods," Inventor: Pinder.

International Search Report dated Apr. 28, 2009 in Application No. PCT/US2008/077157.

"Explorer 8300 Series Digital Recorder" ScientificAtlanta.com [online] Oct. 2005, XP002459851, Retrieved from Internet: URL:http://www.cisco.com/application/pdf/en/us/guest/products/ps8613/c1650/cdc_cont_0900aecd806c6913.pdf [retrieved Nov. 22, 2007].

Gilo: "Do It Yourself Making an External Hard Drive Guide" Notebookreview.com [online], Jun. 2, 2006, XP002459852, Retrieved from Internet: URL:http://www.notebookreview.com/default.asp?newsID=2972 [retrieved on Nov. 22, 2007].

International Search Report dated Jan. 31, 2008 in PCT/US2007/070680.

International Search Report and Written Opinion mailed Sep. 16, 2008 in PCT/US2008/070707.

International Search Report dated Dec. 12, 2008 in PCT/US2008/070690.

Written Opinion dated Dec. 12, 2008 in PCT/US2008/070690.

International Preliminary Report mailed Jan. 6, 2009 in PCT/US2007/072328.

European Office Action mailed May 7, 2009 in Application No. 07 840 308.6.

European Office Action mailed Jun. 9, 2009 in Application No. 07 815 092.7.

European Office Action mailed Sep. 9, 2010 in Application No. 07 840 308.6.

Office Action mailed Sep. 22, 2009, in U.S. Appl. No. 11/454,421.
Office Action mailed Oct. 7, 2009, in U.S. Appl. No. 11/428,367.
Office Action mailed Apr. 13, 2010, in U.S. Appl. No. 11/454,421.
Office Action mailed Apr. 14, 2010, in U.S. Appl. No. 11/428,367.
U.S. Official Action mailed Jun. 17, 2010 in U.S. Appl. No. 11/781,412.
U.S. Official Action mailed Aug. 16, 2010 in U.S. Appl. No. 11/829,647.

U.S. Appl. No. 09/111,958, filed Jul. 8, 1998, entitled "Mechanism and Apparatus for Encapsulation of Entitlement Authorization in Conditional Access System," Inventor: Defreese et al.
U.S. Official Action mailed Dec. 8, 2010 in U.S. Appl. No. 11/781,412.
U.S. Official Action mailed Feb. 2, 2011 in U.S. Appl. No. 11/829,647.

* cited by examiner

CONTROLLED CRYPTOPERIOD TIMING TO REDUCE DECODER PROCESSING LOAD

FIELD OF THE INVENTION

This invention relates in general to broadband communications systems, and more particularly, to controlling the timing of encryption key changes associated with services in the broadband communications system.

BACKGROUND OF THE INVENTION

Conditional access systems, such as satellite, cable television, and direct subscriber line (DSL) systems, often encrypt services that subsequently must be decrypted with encrypting keys prior to viewing. Encryption devices encrypt these services using a series of keys that change on a regular basis to ensure protection of the content. The time interval during which a single key is used is called a cryptoperiod. For example, an encrypting key may change every four (4) seconds; therefore, a cryptoperiod including a changed encrypting key is transmitted every 4 seconds from each encryption device for each encrypted service.

Decoder devices, such as set top boxes, receive the services along with periodic encryption messages, which require timely processing in order to decrypt the received services. Importantly, messages containing the encrypting keys (often embedded within Entitlement Control Messages called ECMs) received by a set top box or other host device are important elements for proper functioning in a conditional access system. Namely, ECMs must be processed within the given time window, for example, every 4 seconds, in order to avoid service interruptions, such as video or audio artifacts. Note that different conditional access technologies use various means for transmission of service encryption keys, which may be included within ECMs and/or other messages, but for the purposes of this application, the term ECMs is meant to include all messages sent in conjunction with, and associated with changes to, the service encryption key.

Often, ECMs are processed by a CAS client on a secure microprocessor device within the set top box or other host device. The secure microprocessor is often single threaded with limited input/output (I/O) bandwidth, and yet must be able to handle the processing load for ECMs of multiple services. As a result, if the number of services requiring decryption increases, the processing demand on the secure microprocessor will also increase, and the chance that multiple ECMs will require simultaneous processing also increases. If this ECM processing demand is not met, especially the demand for processing of multiple simultaneous ECMs, there is a risk of service interruptions. Additionally, it is extremely prohibitive to upgrade the capabilities of the secure microprocessor after it is deployed. Thus, there exists a need for a more efficient system and method that eliminates or at least limits cases where ECMs, or other real-time messages in the encryption system required for decryption of services, from multiple services would need to be processed simultaneously.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards synchronizing a timebase of headend devices that transmit real-time messages, such as ECMs or other messages related to transmission of keys that decrypt incoming services in an encryption system. More specifically, headend devices create cryptoperiods, which involve transmission of real-time messages, in accordance with a common crypto-sync pulse. In this manner, various headend devices are then synchronized. Subsequently, services that are encrypted and transmitted by the headend devices are assigned a time offset value from the common crypto-sync pulse. Accordingly, the cryptoperiod for each service starts at its assigned time offset value. By assigning the time offset values using a suitable algorithm, the chances that a decoder device receives two services that contain co-timed cryptoperiods, which require timely processing of the included real-time message, are dramatically minimized. Advantageously, the decoder devices are then capable of processing the real-time messages in a timely manner while avoiding service interruptions.

Figure 1:
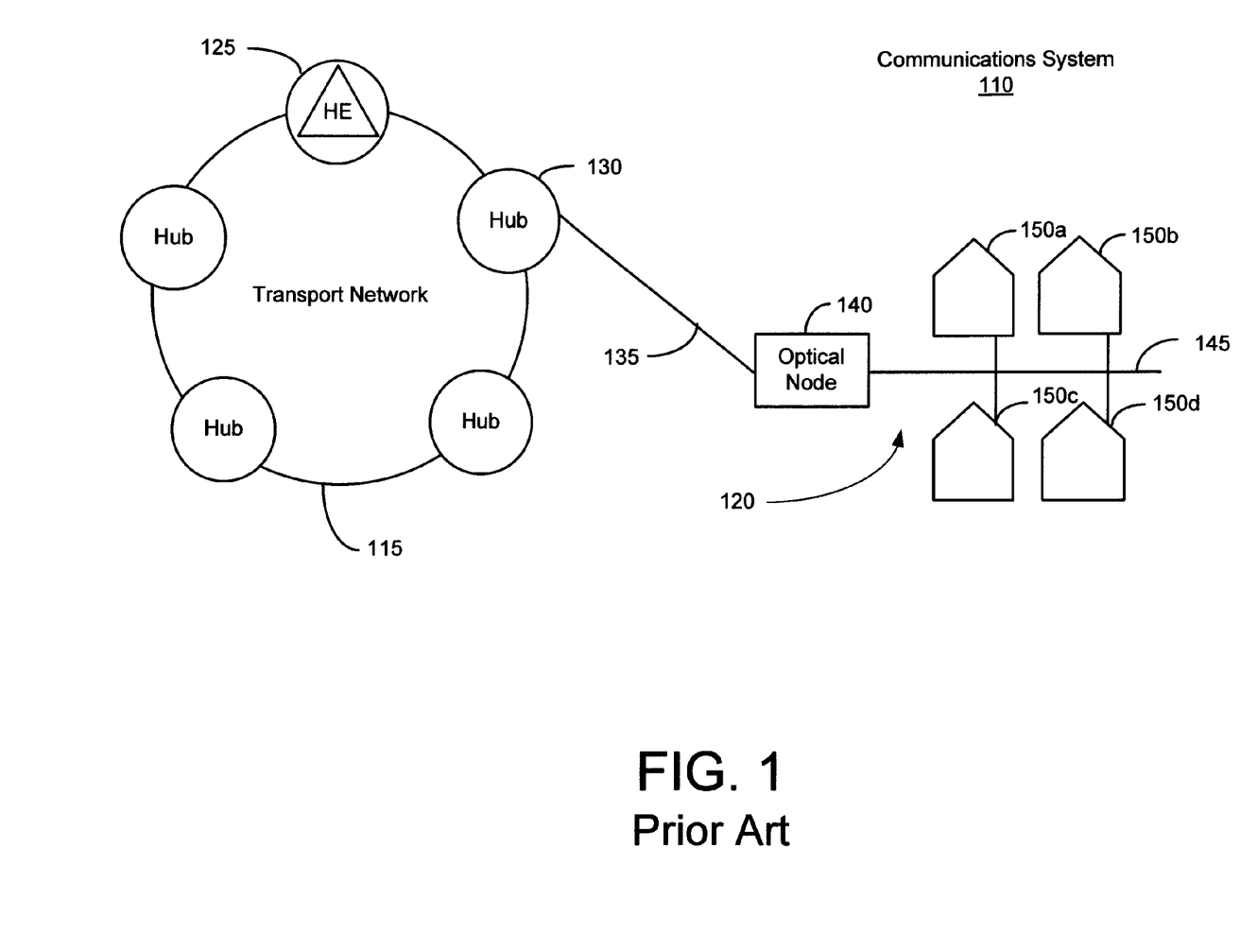
FIG. 1 is an abridged block diagram of a communications system that is suitable for use in implementing the present invention.

FIG. 1 is an abridged block diagram of a communications system 110 that is suitable for use in implementing the present invention. Typically, a communications system 110 includes a transport network 115 and a transmission network 120. The transport network 115, which is fiber optic cable, connects a headend 125 and hubs 130 for generating, preparing, and routing programs and other optical packets over longer distances; whereas a transmission network 120, which is coaxial cable, generally routes electrical packets over shorter distances. Programs and other information packets received, generated, and/or processed by headend equipment is either broadcasted to all subscribers in the system 110 or alternatively, the packets can be selectively delivered to one or more subscribers. Fiber optic cable 135 connects the transport network 115 to an optical node(s) 140 in order to convert the packets from optical packets into electrical packets. Thereafter, coaxial cable 145 routes the packets to one or more subscriber premises 150a-d. Though the example of FIG. 1 is directed towards a hybrid fiber/coax communications system, other communications systems are envisioned, such as Internet Protocol television (IPTV) and satellite systems.

Figure 2:
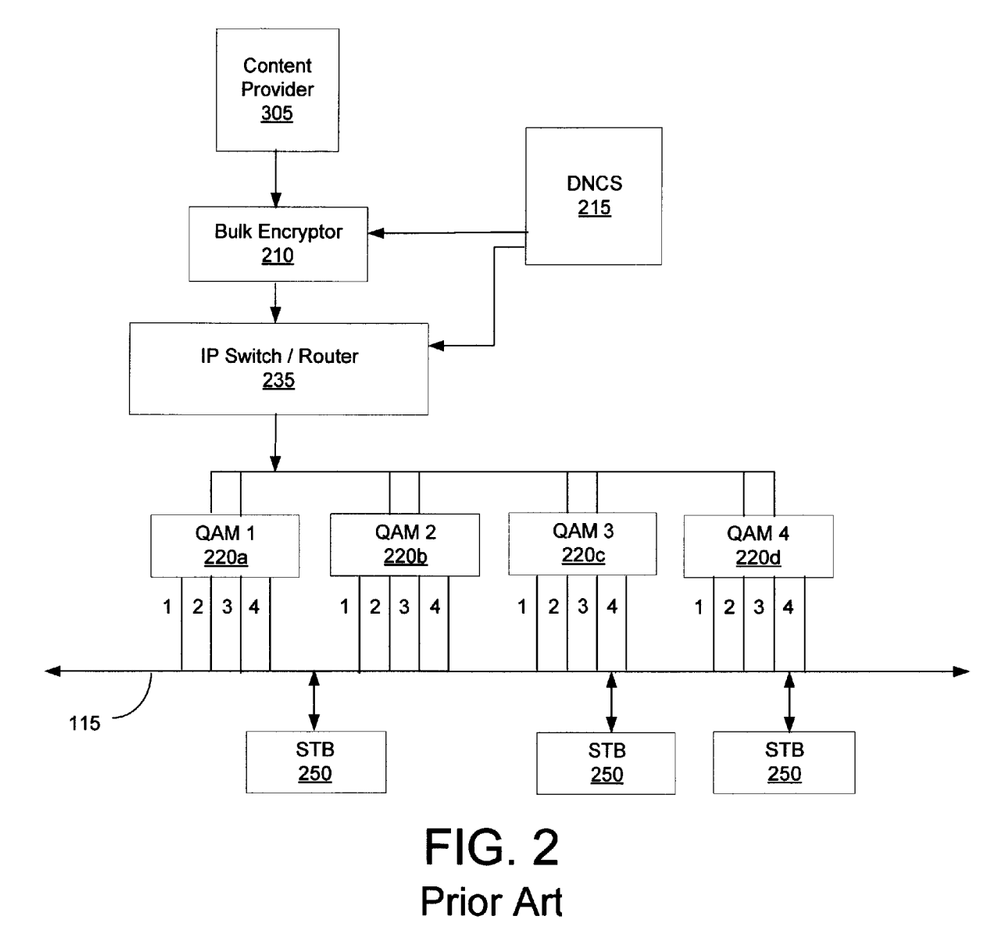
FIG. 2 is an abridged block diagram of program provider devices that are suitable for use in the communications system of FIG. 1.

FIG. 2 is an abridged block diagram of program provider devices that are suitable for use in the communications system of FIG. 1. Content providers generate and transmit services comprising programs to content provider equipment 205 located in the headend 125. Under the direction of a digital network control system (DNCS) 215, a bulk encryptor 210 encrypts the services received from the content provider equipment 205. The DNCS 215 also specifies an intended modulator, e.g., QAM 220d. The QAMs 220a-d may also encrypt services that are received from other devices and have not been previously encrypted by the bulk encryptor 210. For all services, the intended QAM 220a-d then modulates the services onto a radio frequency (RF) carrier for transport on the transport network 115. It will be appreciated that the present invention is not limited to QAM modulation, but rather envisions any type of modulation scheme; additionally, the modulators can also be multi-modulators and/or Gigabit Ethernet (GbE) QAM modulators.

Figure 3:
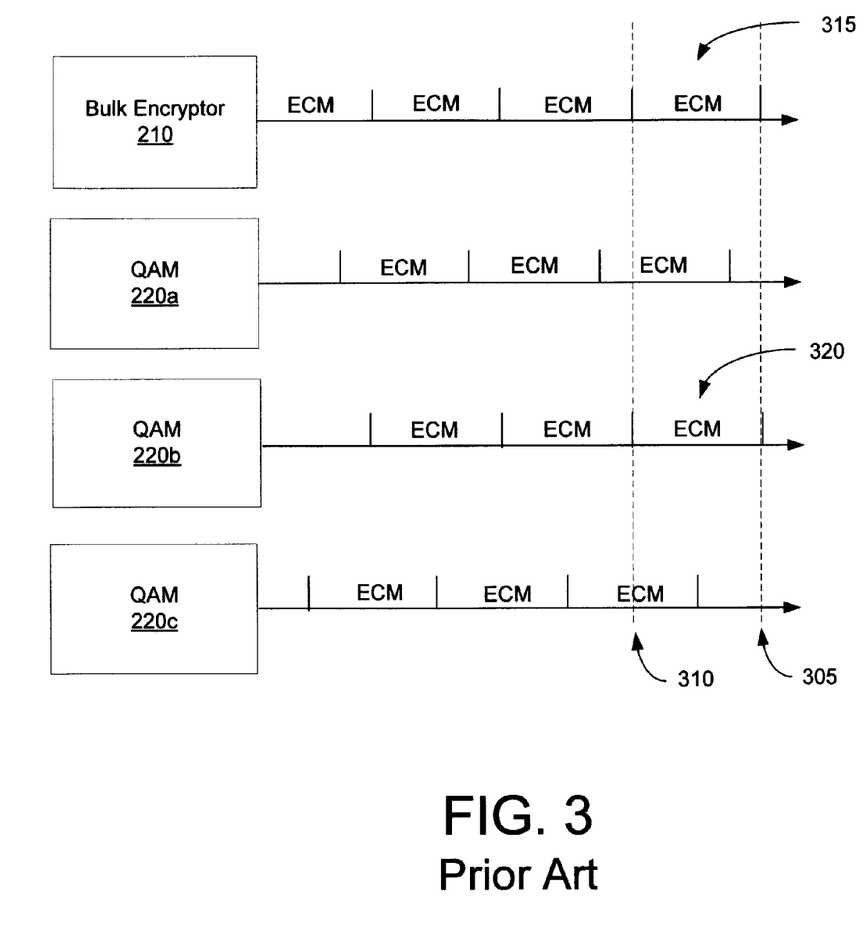
FIG. 3 is a block diagram of various encryptors (e.g., bulk encryptor, QAMs) providing encrypted services and real time messages to the network.

FIG. 3 is a block diagram of various encryptors (e.g., bulk encryptor 210, QAMs 220a-c) providing encrypted services and real-time messages to the network 115. The bulk encryptor 210 and encryptors 220a-c provide real-time messages, e.g., ECMs, in cryptoperiods having boundaries 305, 310. As mentioned, the encrypting key may be changed as often as every 4 seconds for each service, thereby requiring frequent cryptoperiods. Disadvantageously, since the cryptoperiods, or boundaries, are not synchronized among all encryption devices, real-time messages received by a decoder device may require simultaneous processing. For example, the ECMs 315, 320 transmitted from the bulk encryptor 210 and the QAM 220b have common boundaries 305, 310. If a decoder device is decrypting both services, the decoder device would require simultaneous processing of ECMs 315, 320. As mentioned, the requirement of simultaneously processing real-time messages by a decoder device may result in audio and video service interruptions.

Figure 4:
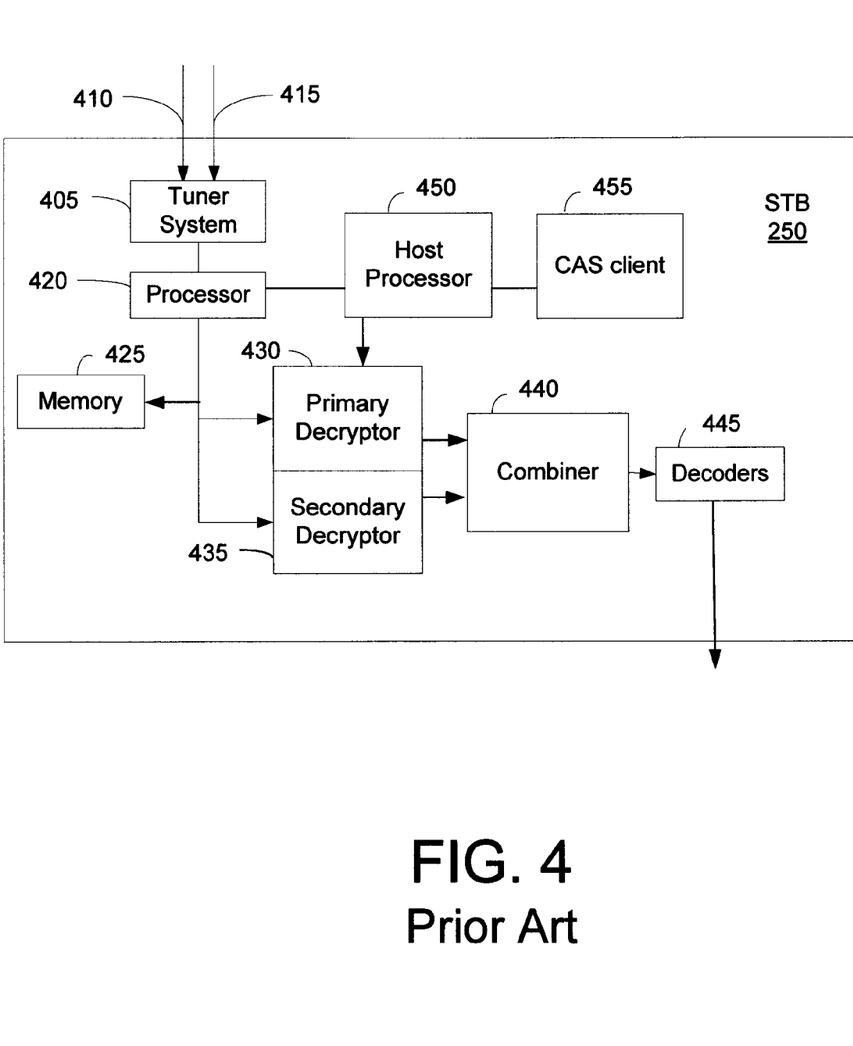
FIG. 4 is a block diagram of a set top box 250 that receives and processes the real-time messages.

FIG. 4 is a block diagram of a set top box 250 that receives and processes the real-time messages. The set top box 250 may filter a service by tuning to a channel frequency via a tuner system 405. The tuner system 405, which may include a single tuner or more than one tuner, then begins to receive and filter the desired service that is either broadcasted or transmitted directly to that particular set top box. The programs being shown on a service and real-time messages are typically received on an in-band port 410 and other data messages are typically received on an out-of-band port 415. A processor 420 processes the service in a known manner and routes the program to memory 425 for storing and/or to one of a primary decryptor 430 or a secondary decryptor 435 for decryption. The primary decryptor 430 typically decrypts the program when it is to be displayed on a television's main display screen. The secondary decryptor 435 is typically used when the program is to be displayed in a picture-in-picture (PIP) screen located within the main display screen or when a second program is being recorded. A combiner 440 combines the two programs from the decryptors 430, 435, if necessary, and one or more decoders 445 then decode the programs for display on the television. It will be appreciated that there may include any number of decryptors, as desired.

Also included in the set top box 250 are a host processor 450 and a conditional access (CAS) client 455. The host processor 450 is a generic, non-CAS specific processor, which initiates commands to and waits for responses from the CAS client 455. The real-time messages associated with the CAS are received by the host processor 450. The host processor 450 then sends an appropriate command to the CAS client 455 via an I/O link in order to process the CAS message. The CAS client 455 then processes and produces a decryption message in order to decrypt the incoming services and responds back to the host processor 450. The CAS client 455 then waits for another command. Once the host processor 450 receives the CAS client response, the host processor 450 sends the decryption response, which may be a decryption key, an encrypted version of the decryption key, or some other message, to the primary and/or secondary decryptors 430, 435. As previously mentioned, the CAS client 455 is typically a single threaded device with limited I/O bandwidth, so when real-time messages, e.g., ECMs, are simultaneously received, for example, when the tuner system 405 is receiving a plurality of services that require decryption, the CAS client 455 is not capable of simultaneously processing the simultaneous commands.

Figure 5:
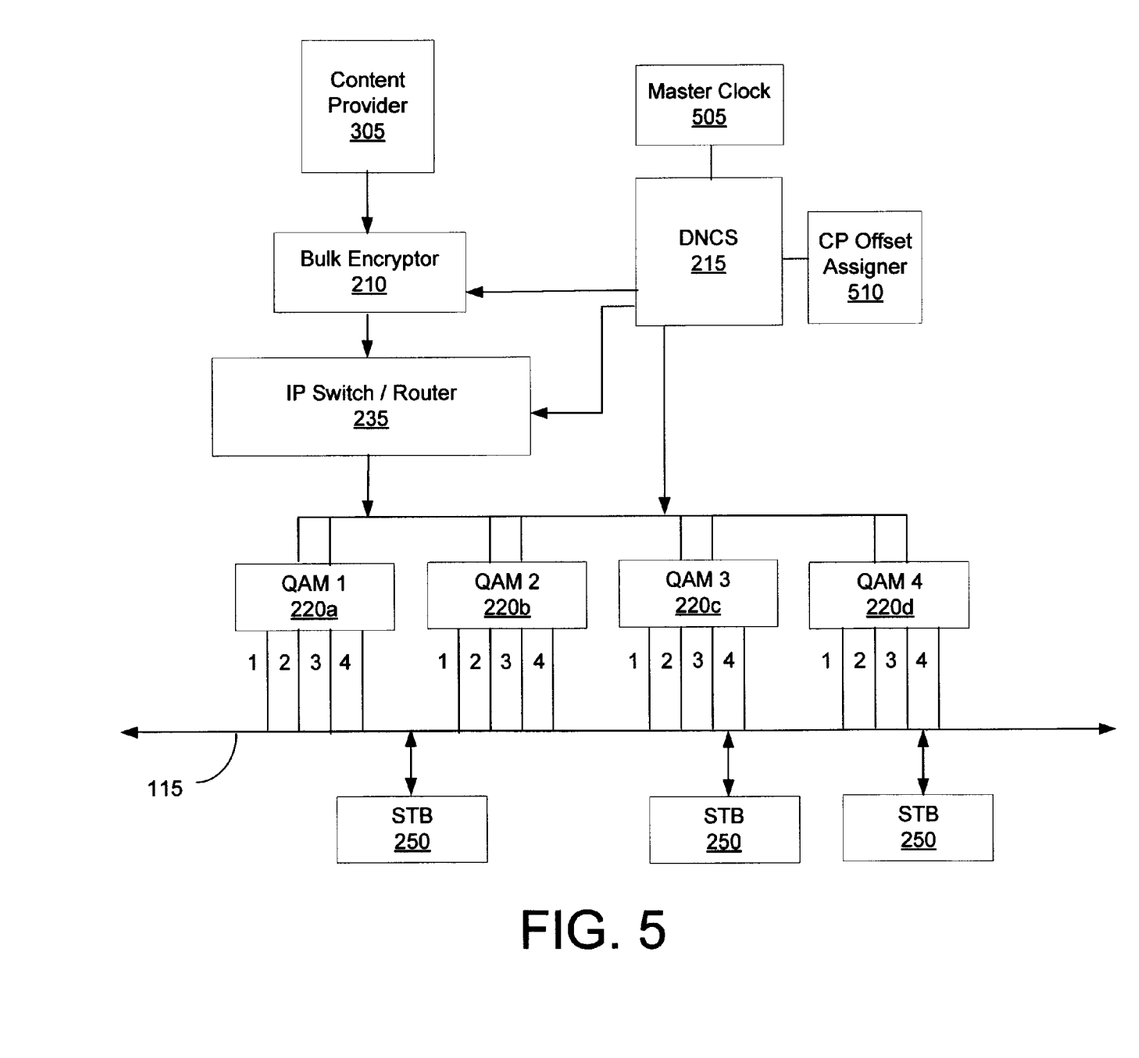
FIG. 5 is an abridged block diagram of program provider devices that are suitable for use in implementing the present invention.

FIG. 5 is an abridged block diagram of program provider devices that are suitable for use in implementing the present invention. A master clock 505 and a cryptoperiod offset assigner 510 are coupled to the DNCS 215. Accordingly, all encryptor devices (e.g., the bulk encryptor 210 and QAMs 220a-d) align their local clocks to the master clock 505. This may be accomplished by using NTP over an IP network in order to align the local clocks. The DNCS 215 then determines a regularly scheduled crypto-sync pulse. Each encryptor device then receives a message stating the starting time and the schedule for the crypto-sync pulse. For example, if the crypto-sync pulse period is set for 4 seconds, each device is told that at noon (12:00:00), for example, there is a pulse and at 4 second intervals thereafter. Since all clocks are synchronized, each encryptor device can establish the same crypto-sync pulse. The cryptoperiod offset aligner 510 determines offset values, and the DNCS 215 then assigns the offset value from the crypto-sync pulse to each service encrypted by the bulk encryptor 210 or the QAMs 220a-d. Accordingly, the cryptoperiod for each service starts at the assigned offset value from the crypto-sync pulse. Advantageously, by assigning the offset values for each service, the chances that two services have co-timed cryptoperiods are minimized. The cryptoperiod offset aligner 510 may use a plurality of different algorithms in order to determine the offset value. Some examples are described hereinbelow.

Figure 6:
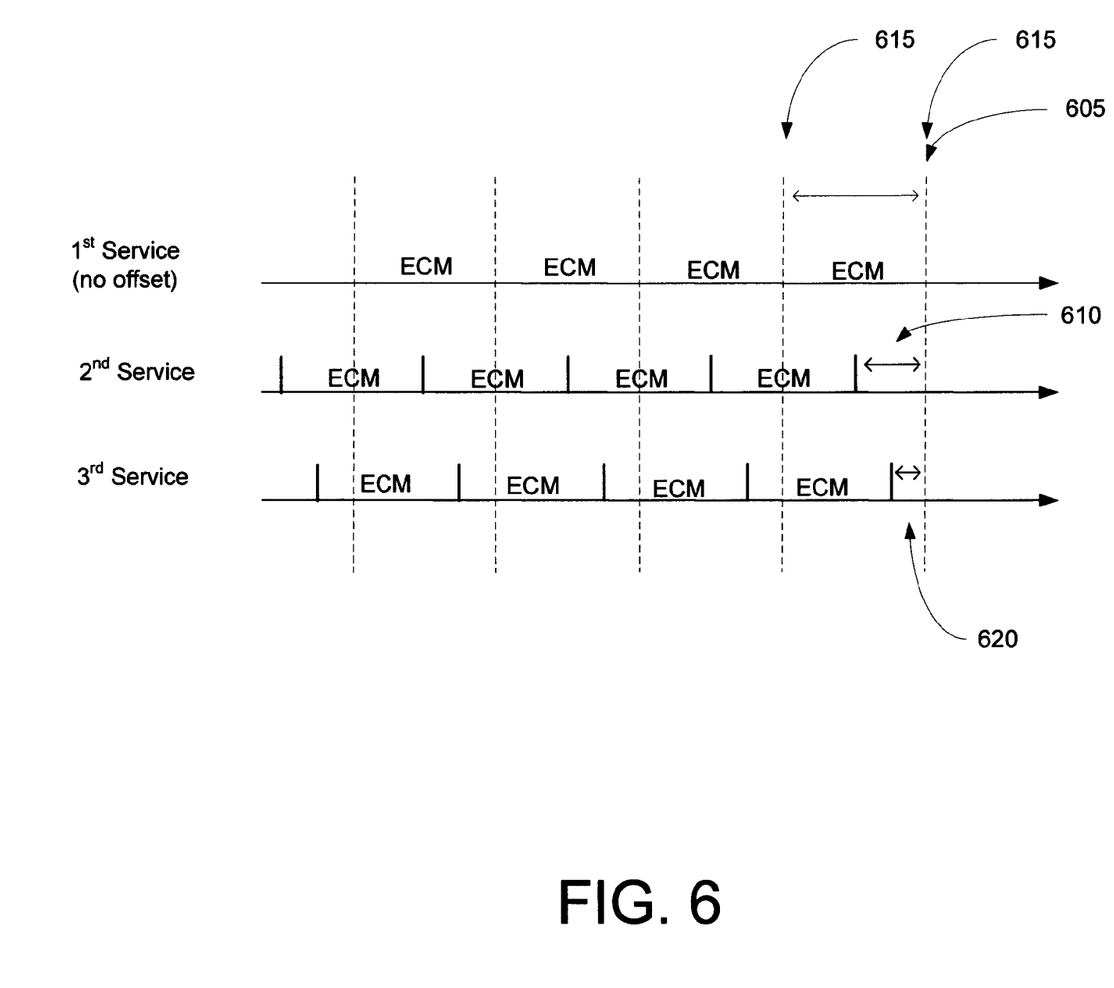
FIG. 6 is a diagram illustrating a plurality of real-time messages having common crypto-sync pulses and offset cryptoperiods, which are determined by a pseudo-random number generator and algorithm in accordance with the present invention.

FIG. 6 is a diagram illustrating a plurality of real-time messages having common crypto-sync pulses and offset cryptoperiods, which are determined by a pseudo-random number generator and algorithm in accordance with the present invention. A pseudo-random number generated included in the cryptoperiod offset aligner 510 randomly selects an offset value from a first common crypto-sync pulse 615. The DNCS 215 then assigns each service a randomly-selected offset value. For example, as shown, a first service, e.g., HBO, that is provided by one of the encryptor devices (e.g., QAMs 220*a-d*, bulk encryptor 210) includes an offset value equal to zero (0) from the first common crypto-sync pulse 615. The encryptor device then begins the cryptoperiod, which includes real-time messages, for the first service at the same time as the first common crypto-sync pulse 615. A second service may be assigned some randomly-selected offset value 610 relative to the crypto-sync pulses. Furthermore, a third service may be assigned a different randomly-selected offset value 620 relative to the crypto-synch pulses. The cryptoperiod offset assigner 510 continues in this manner of randomly selecting an unused offset value for all encrypted services.

Figure 7:
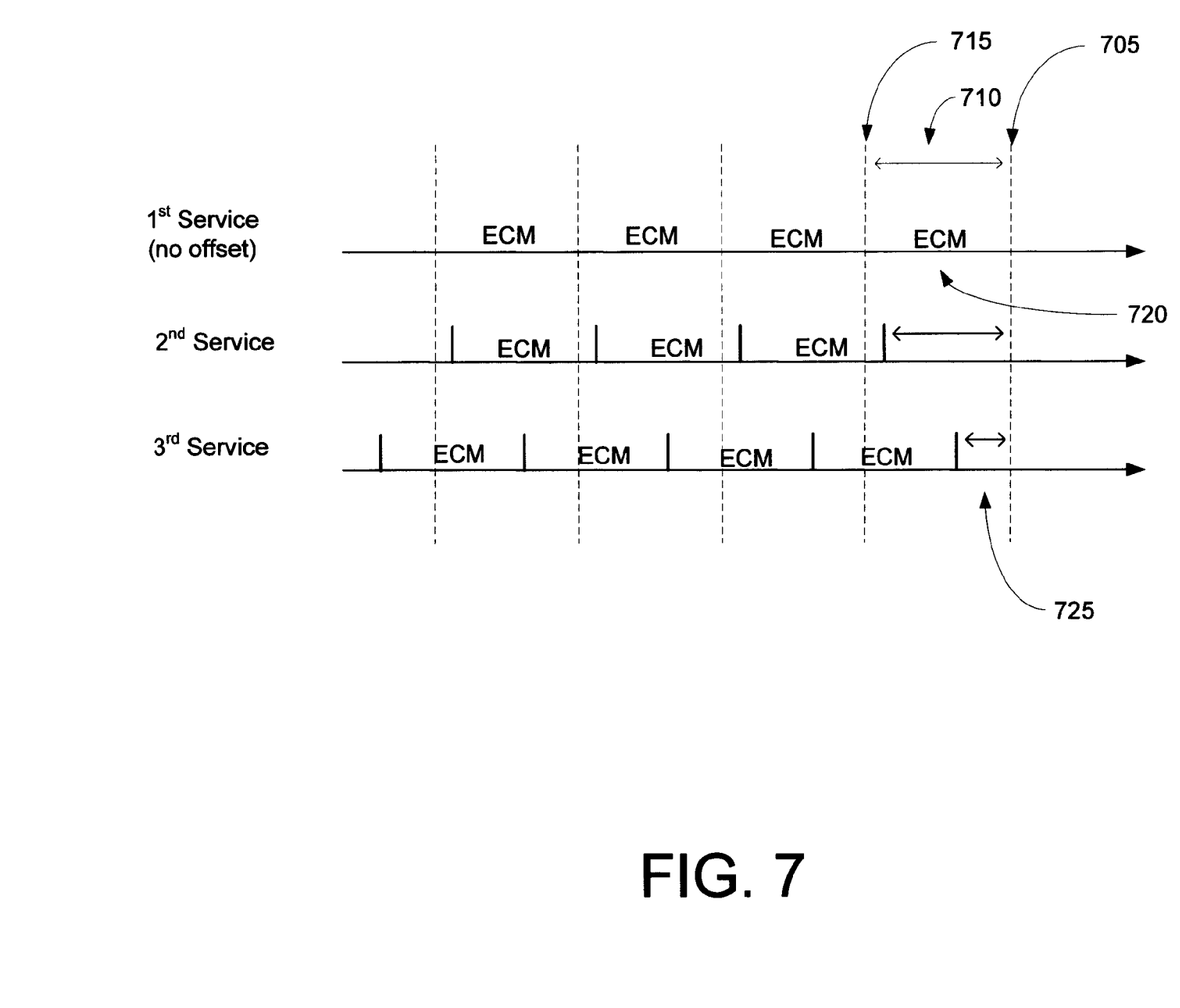
FIG. 7 is a diagram illustrating a plurality of real-time messages having common crypto-sync pulses and offset cryptoperiods, which are determined by searching and determining the maximum time gap between the current offset values within a crypto-sync pulse boundary.

In accordance with the present invention, FIG. 7 is a diagram illustrating a plurality of real-time messages having common crypto-sync pulses and offset cryptoperiods, which are determined by searching and determining the maximum time gap between the current offset values within crypto-sync pulse boundaries. The cryptoperiod offset assigner 510 then assigns to another service the determined offset value that bisects this maximum gap. For example, as shown in FIG. 7, a common crypto-sync pulse 705 has a predetermined length of time or number of slots between a beginning crypto-sync pulse and a next scheduled crypto-sync pulse, i.e., crypto-sync pulse boundaries. A first service may begin having no offset value and, therefore, begins sending real-time messages at each crypto-sync pulse. A second service, as shown, follows later within the crypto-sync period at an offset value 710. For the third and following services, the cryptoperiod offset assigner 510 then determines that the maximum gap between the first and second service offsets, and may assign a third service an offset value 715 somewhere between the first and second offset. The cryptoperiod offset assigner 510 then evaluates all assigned offsets to determine the next offset where there exists the greatest gap between offsets.

Figure 8:
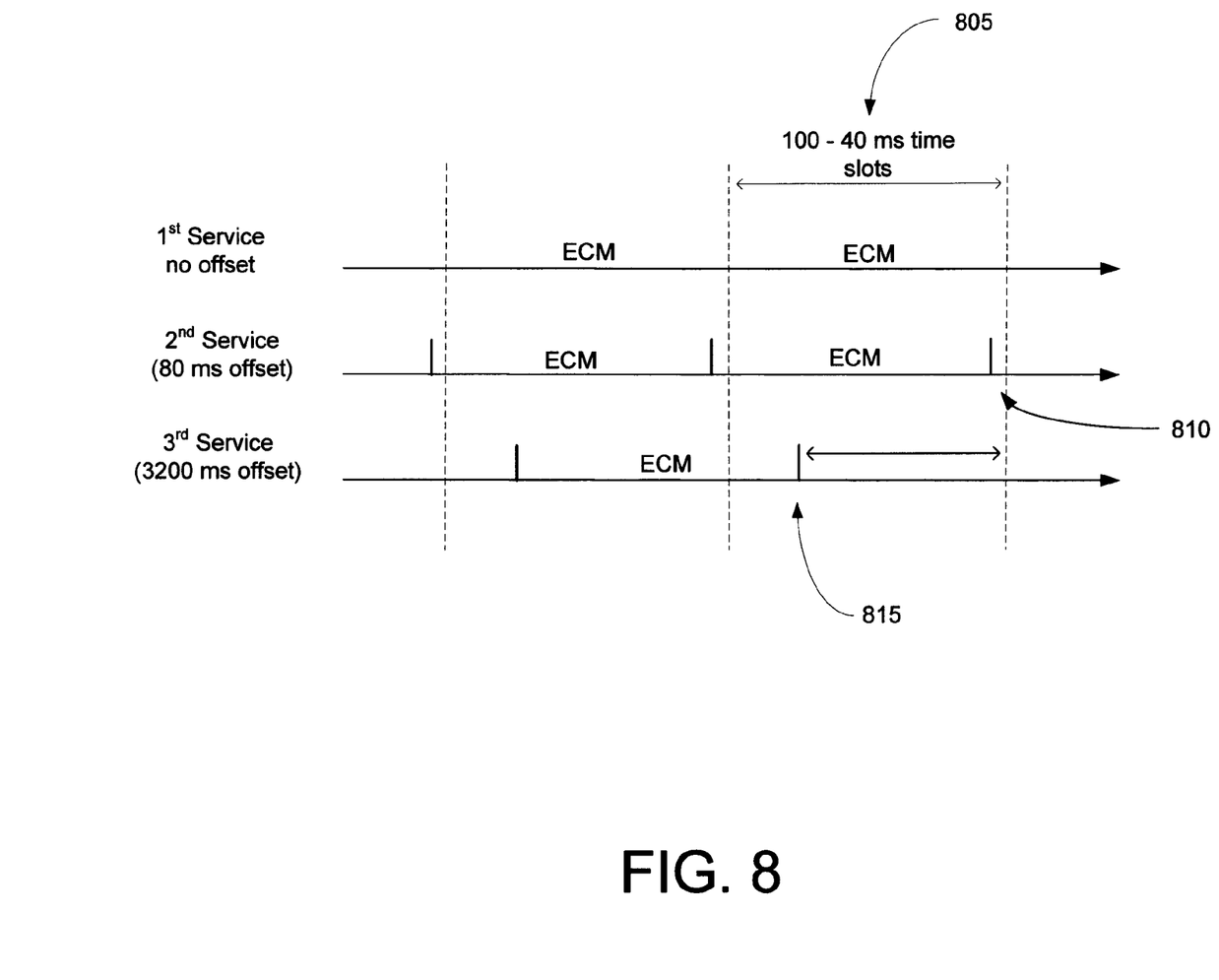
FIG. 8 is a diagram illustrating a plurality of real-time messages having common crypto-sync pulses and offset cryptoperiods, which are determined by dividing the crypto-sync pulse into even time slots based on real-time message processing time.

In accordance with the present invention, FIG. 8 is a diagram illustrating a plurality of real-time messages having common crypto-sync pulsed and offset cryptoperiods, which are determined by dividing the crypto-sync pulse into even time slots based on real-time message processing time. For example, if a crypto-sync pulse is 4 seconds, then the crypto-sync pulse can be divided evenly into 100 40 ms slots 805. It will be appreciated that any number of time slots may divide the crypto-sync pulse boundaries. The cryptoperiod offset aligner 510 can then assign a service an empty slot, for example, an available 3200 ms slot 810 may be assigned to a second service. The encryptor device that encrypts and provides that service then starts each cryptoperiod for the second service at the 3200 ms time slot within each crypto-sync pulse. Furthermore, the cryptoperiod offset aligner 510 may assign a third service an available 1000 ms offset 815. Accordingly, each service for every encrypting device is assigned an available time slot within the 100 40 ms slots 805. When all time slots have been filled with a service, the cryptoperiod offset aligner is allowed to place two or more services in each slot, but it always chooses a slot with the least number of assigned services, therefore evenly spreading the services over the cryptoperiod.

Figure 9:
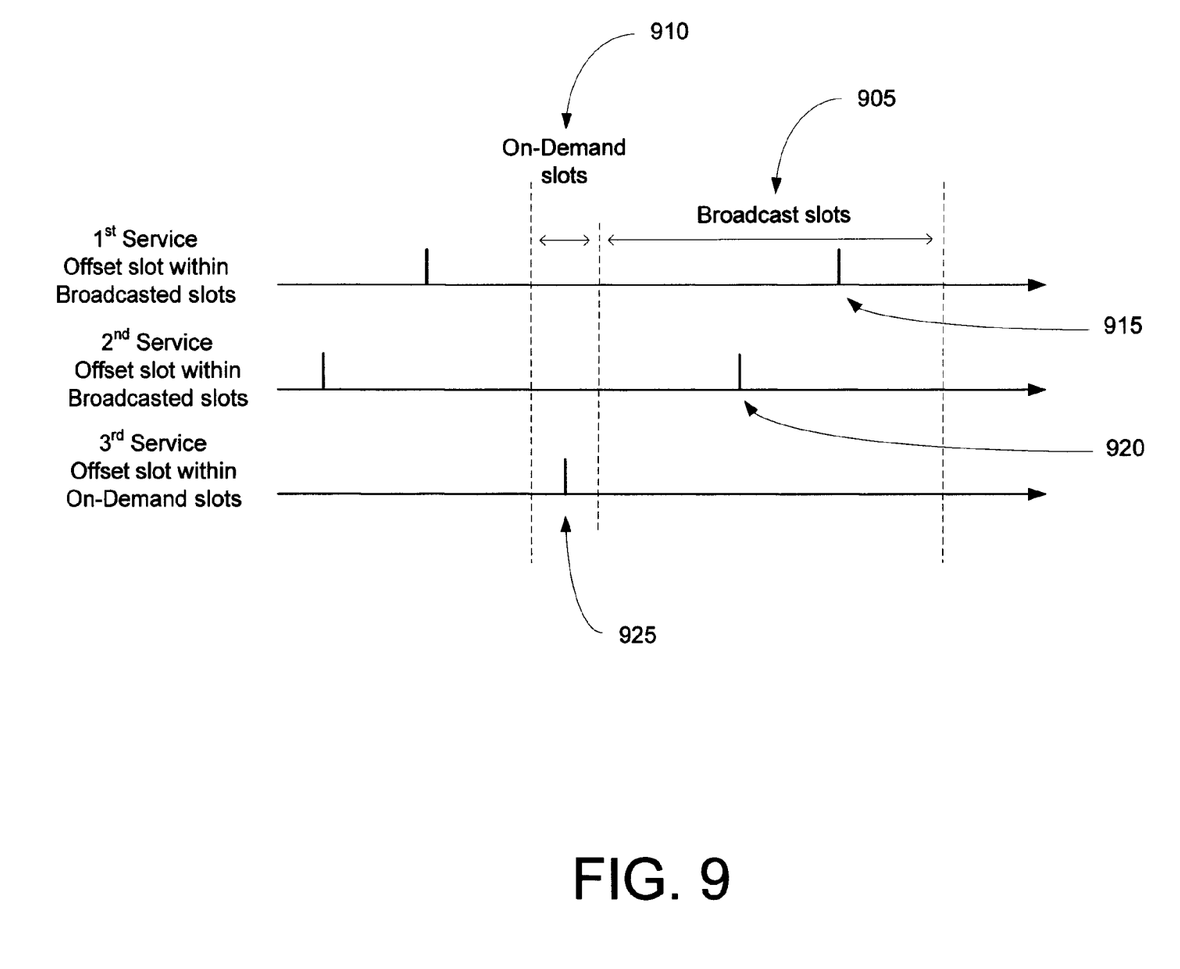
FIG. 9 is a diagram illustrating a plurality of real-time messages having common crypto-sync pulses and offset cryptoperiods, which are determined by dividing the crypto-sync pulse into slots and further grouping the divided slots.

In accordance with the present invention, FIG. 9 is a diagram illustrating a plurality of real-time messages having a common crypto-sync pulse and offset cryptoperiods, which are determined by dividing the crypto-sync pulse into slots and further grouping the divided slots. For example, a first group of slots 910 (e.g., slots 1-95) are reserved as broadcast slots. The broadcast slots are assigned to broadcasted encrypted services. ECMs relating to the broadcasted services are global in nature, and the timing of their arrival cannot be controlled on an individual decoder basis. On the other hand, on-demand services are assigned the on-demand slots 905 (e.g., slots 96-100). Since on-demand services are not global in nature, the timing of the ECM arrival can be controlled on an individual decoder basis. In other words, on-demand services and associated real-time messages can be provided at convenient times as opposed to broadcasted services. Accordingly, as shown in FIG. 9, broadcasted first and second services can be assigned available slots 915, 920 within a crypto-sync pulse boundary. A third on-demand service can be assigned an available slot 925 within the on-demand slots 905.

Figure 10:
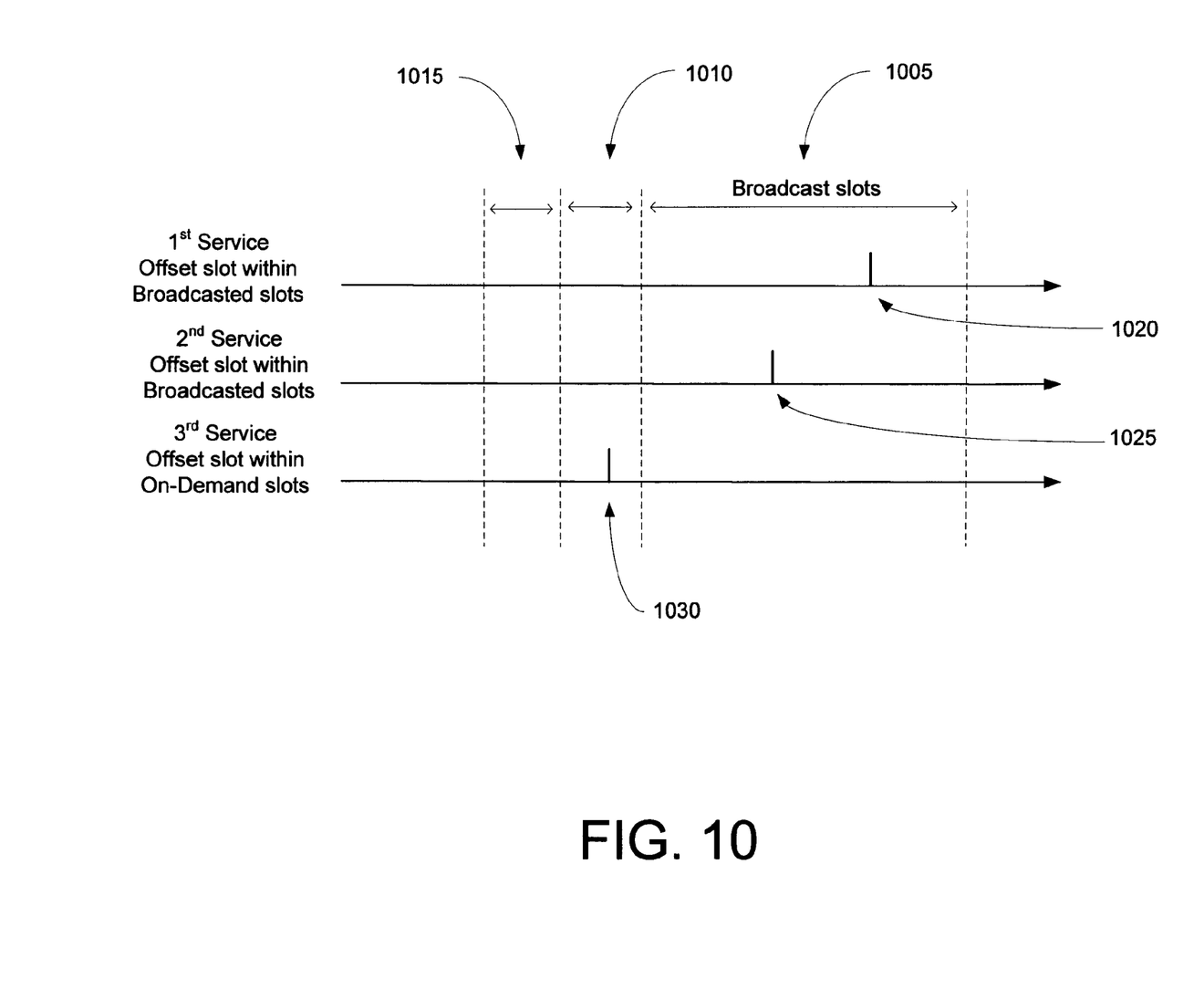
FIG. 10 is a diagram illustrating a plurality of real-time messages having common crypto-sync pulses and offset cryptoperiods, which are determined by dividing the crypto-sync pulse into slots and further grouping the divided slots that also include unassigned slots.

In accordance with the present invention, FIG. 10 is a diagram illustrating a plurality of real-time messages having a common crypto-sync pulse and offset cryptoperiods, which are determined by dividing the crypto-sync pulse into slots and further grouping the divided slots that also include unassigned slots. For example, as stated above, a first group of slots 1015 (e.g., slots 1-90) may be reserved as broadcast slots for broadcasted services. First and second broadcasted services may be assigned available slots 1020, 1025 within the crypto-sync boundary. A second group of slots 1010 (e.g., slots 91-95) may be reserved as on-demand slots, such as available on-demand slot 1030 for a third on-demand service. Additionally, a third group of slots 1005 (e.g., slots 96-100) may never be assigned. The unassigned slots guarantee the CAS client 455 has time to perform other operations within every crypto-sync pulse. The number of unassigned slots can be controlled based on expected worse-case time required for these other operations. Furthermore, a global message could be transmitted to all decoder devices (e.g., set top boxes or host devices) indicating the start and duration of the unassigned slot period, thereby allowing the decoder devices to process other messages.

Accordingly, systems and methods have been provided that allow encryptor devices to provide real-time messages having offset cryptoperiods according to an offset algorithm within a common crypto-sync pulse boundary. Example algorithms were described herein; however, there may include any number of algorithm options that include both hardware and software. Additionally, examples herein show 100 even-sized slots in a crypto-sync pulse boundary, but there may be any number of slots as well as including some slots that are larger than other slots. It will be appreciated that further embodiments are envisioned that implement the invention, for example, using all software or adding modes for additional features and services.

What is claimed is:

1. A method for controlling the transmission of real-time messages that are created by a plurality of encryptor devices, the method comprising the steps of:
repeatedly transmitting a common timebase signal to the plurality of encryptor devices, wherein the timebase signal establishes common pulse boundaries;
determining an available offset value to the common pulse boundaries for a plurality of services transmitted by one of the plurality of encryptor devices, where each service has a different offset value;
associating each determined offset value to each of the plurality of services; encrypting each of the plurality of services and transmitting real-time messages associated with the encrypted plurality of services; and from each of the plurality of encryptor devices, transmitting the real-time messages associated with each of the encrypted plurality of services, wherein the real-time messages change at a time determined by the common pulse boundaries and the determined offset value.

2. The method of claim 1, wherein determining the available offset value comprises randomly selecting an available offset between the common pulse boundaries.

3. The method of claim 1, wherein determining the offset value step comprises determining a maximum gap between unavailable offset values between the common pulse boundaries.

4. The method of claim 1, wherein determining the offset value step comprises:
dividing the common pulse boundaries into a plurality of time slots; and
assigning an available time slot between the common pulse boundaries to a service.

5. The method of claim 1, wherein determining the offset value step comprises:
dividing the common pulse boundaries into a plurality of slots;
grouping a first plurality of slots into broadcasted slots and a second plurality of slots into on-demand slots; and
assigning an available slot from the first plurality of slots for a broadcasted service and an available slot from the second plurality of slots for an on-demand service.

6. The method of claim 1, wherein determining the offset value step comprises:
dividing the common pulse boundaries into a plurality of slots;
grouping a first plurality of slots into broadcasted slots, a second plurality of slots into on-demand slots, and a third plurality of slots into unassigned slots; and
assigning an available slot from the first plurality of slots for a broadcasted service and an available slot from the second plurality of slots for an on-demand service.

7. The method of claim 6, further comprising the step of transmitting a global message indicating a start and duration of the unassigned slots.

8. The method of claim 7, further comprising the step of processing messages during the duration of the unassigned slots.

9. The method of claim 6, further comprising the step of dynamically changing the first, second, and third plurality of slots depending upon how many broadcasted and on-demand services are transmitted.

10. The method of claim 1, further comprising the steps of:
receiving an encrypted service at a decoder device;
providing the encrypted service to one of a plurality of decryptors;
receiving a real-time message associated with the encrypted service;
providing the real-time message to a conditional access client;
determining a control word associated with the real-time message;
providing the control word to one of the plurality of decryptors; and
decrypting the encrypted service in accordance with the control word.

11. The method of claim 1, further comprising the steps of:
receiving a plurality of encrypted services at a decoder device; and
receiving a plurality of real-time messages, each real-time message associated with one of the plurality of encrypted services, wherein each real-time message is received and processed according to each determined offset value within the common pulse boundaries.

12. The method of claim 11, further comprising the step of, within each common pulse boundary, receiving a new plurality of real-time messages associated with the received plurality of encrypted services.

13. A system for controlling the transmission of real-time messages, the system comprising:
a memory storage; and
a processing unit coupled to the memory storage, wherein the processing unit is operative to:
using a plurality of encryptors, encrypt services and transmit real-time messages associated with the encrypted services;
synchronize, using a master clock, the plurality of encryptors and an offset assigner, having a common pulse with a duration, wherein the offset assigner determines an offset value within each common pulse duration for each service and transmits the offset value to an encryptor associated with the transmitted encrypted service; and
receive and filter, using a plurality of decoder devices, one or more encrypted services and the associated real-time messages, each decoder device comprising:
a conditional access system for receiving a real-time message associated with an encrypted service, and for providing a control word in order to decrypt the encrypted service wherein the conditional access system receives a new real-time message associated with the encrypted service at every determined offset value within the common pulse duration; and
at least one decryptor, each decryptor for receiving the encrypted service and for decrypting the encrypted service with the control word.

14. A system for controlling the transmission of real-time messages, the system comprising:
a memory storage; and
a processing unit coupled to the memory storage, wherein the processing unit is operative to;
repeatedly transmit a common timebase signal to a plurality of encryptor devices, wherein the timebase signal establishes common pulse boundaries,
determine an available offset value to the common pulse boundaries for a plurality of services transmitted by one of the plurality of encryptor devices, where each service has a different offset value,
associate each determined offset value to each of the plurality of services, and
encrypt each of the plurality of services and transmit real-time messages associated with the encrypted plurality of services; and
from each of the plurality of encryptor devices, transmit the real-time messages associated with each of the encrypted plurality of services, wherein the real-time messages change at a time determined by the common pulse boundaries and the determined offset value.

15. The system of claim 14, wherein the processing unit being operative to determine the available offset value comprises the processing unit being operative to randomly select an available offset between the common pulse boundaries.

16. The system of claim 14, wherein the processing unit being operative to determine the offset value comprises the processing unit being operative to determine a maximum gap between unavailable offset values between the common pulse boundaries.

17. The system of claim 14, wherein the processing unit being operative to determine the offset value comprises the processing unit being operative to:
- divide the common pulse boundaries into a plurality of time slots; and
- assign an available time slot between the common pulse boundaries to a service.

18. The system of claim 14, wherein the processing unit being operative to determine the offset value comprises the processing unit being operative to:
- divide the common pulse boundaries into a plurality of slots;
- group a first plurality of slots into broadcasted slots and a second plurality of slots into on-demand slots; and
- assign an available slot from the first plurality of slots for a broadcasted service and an available slot from the second plurality of slots for an on-demand service.

19. The system of claim 18, further comprising the processing unit being operative to transmit a global message indicating a start and duration of the unassigned slots.

20. The system of claim 19, further comprising the processing unit being operative to process messages during the duration of the unassigned slots.

* * * * *